Nov. 3, 1970 W. F. WILEY, JR 3,538,506
SUPER-REGENERATIVE OSCILLATOR TARGET DETECTION SYSTEM
Filed Sept. 10, 1968

Wallace F. Wiley, Jr.,
Inventor,
Koenig, Senniger,
Powers and Leavitt,
Attorneys.

United States Patent Office 3,538,506
Patented Nov. 3, 1970

3,538,506
SUPER-REGENERATIVE OSCILLATOR TARGET DETECTION SYSTEM
Wallace F. Wiley, Jr., Prairie Village, Kans., assignor to Bonzer Inc., Shawnee, Kans., a corporation of Kansas
Filed Sept. 10, 1968, Ser. No. 758,784
Int. Cl. G01s 9/02, 9/04
U.S. Cl. 343—7
14 Claims

ABSTRACT OF THE DISCLOSURE

The radar apparatus disclosed herein employs a super-regenerative oscillator for detecting the presence of a target at a predetermined range or distance. By periodically varying the bias signal applied to the oscillator, its squeg rate is varied between a first squeg rate corresponding to the predetermined range and a second squeg rate which is half the first squeg rate. A target at the predetermined range is indicated when the random noise generated by the oscillator exhibits substantial amplitude variation in synchronism with the periodical variation of the squeg rate. The use of the two squeg rates prevents ambiguity in the indication.

BACKGROUND OF THE INVENTION

This invention relates to radar apparatus and more particularly to such apparatus employing a super-regenerative oscillator for detecting the presence of a target at a predetermined range.

In a super-regenerative oscillator which periodically bursts into oscillations at a characteristic frequency, there is an interval occurring just prior to each burst of oscillations during which the operation of the oscillator is quite sensitive to disturbances at the characteristic frequency. The oscillator will thus function as a sensitive detector of received energy at the characteristic frequency during these intervals.

It has previously been known to employ a super-regenerative oscillator for radar purposes by utilizing the periodically generated bursts of oscillations provided by such an oscillator as the transmitted pulses and by employing the sensitive period preceding each such burst of oscillations for detecting reflected signals. The repetition rate of the oscillator, that is, the rate at which it repeats the bursts of oscillations, is usually referred to as the squeg rate. The squeg rate and, reciprocally, the squeg period can be varied or controlled by varying the biasing of the oscillator. When the squeg period corresponds to the distance to a wave reflecting target, the operation of the oscillator will be affected by the reception of reflected energy during the sensitive period of operation. Thus, the squeg period corresponding to the target distance is a measure of the target distance. However, assuming the oscillator is allowed to run freely, the operation of the oscillator may indicate the presence of a target not only at the range corresponding to the actual squeg but also at ranges corresponding to squeg periods which are integer multiples of the actual squeg period. This is caused by the fact that radio frequency energy reflected from a target or object at a substantial distance may return after an interval which is substantially a multiple of the actual squeg period and thus be received during the sensitive portion of a squeg cycle which is more than one squeg cycle removed from the cycle which transmitted the energy. In other words, there is ambiguity latent in the indication provided by such a radar. For example, if such an oscillator is operated with a squeg period corresponding to a predetermined range of 300 feet. It may respond not only to targets at 300 feet, but also to targets at other longer ranges such as 700 feet and 1100 feet. It may be noted that these longer ranges are not integer multiples of one another due to the offset or slight delay between the sensitive portion of each squeg cycle of the oscillator and the portion during which the transmitted radio frequency energy is generated. The squeg periods corresponding to these longer ranges are, however, integer multiples of the squeg period corresponding to the predetermined range.

While returns from longer ranges will typically be weaker than those reflected from a target at the predetermined range, the response may be strong enough to cause difficulty in discrimination, particularly if the target is highly reflective. Reflections from targets at a range corresponding to twice the actual squeg period may be particularly strong and are thus most likely to cause difficulty while returns from targets at ranges corresponding to three or more times the actual squeg period are typically so attenuated that the response is easily rejected by level discrimination.

Among the several objects of the present invention may be noted the provision of radar apparatus employing a super-regenerative oscillator which will detect the presence of a target at a predetermined range without ambiguity; the provision of such apparatus which is highly reliable; and the provision of such apparatus which is relatively simple and inexpensive. Other objects and features will be in part apparent and in part pointed out hereinafter.

SUMMARY OF THE INVENTION

Briefly, radar apparatus of this invention is operative to detect the presence of a target at a predetermined range. The appartus employs a super-regenerative oscillator having a squeg rate which varies as a function of a bias signal applied to the oscillator. Means are provided for periodically switching the bias signal between at least a first predetermined level and a second predetermined level, the first level providing a first squeg rate corresponding to the predetermined range and the second level providing a second squeg rate having a period which is an integer multiple of the period of the first squeg rate. A signal indicating the presence of a target at the predetermined range is provided when substantial variations in the amplitude of the random noise generated by the oscillator occur in synchronism with the periodical variation of the bias signal whereby the indicating signal is provided only at the predetermined range.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
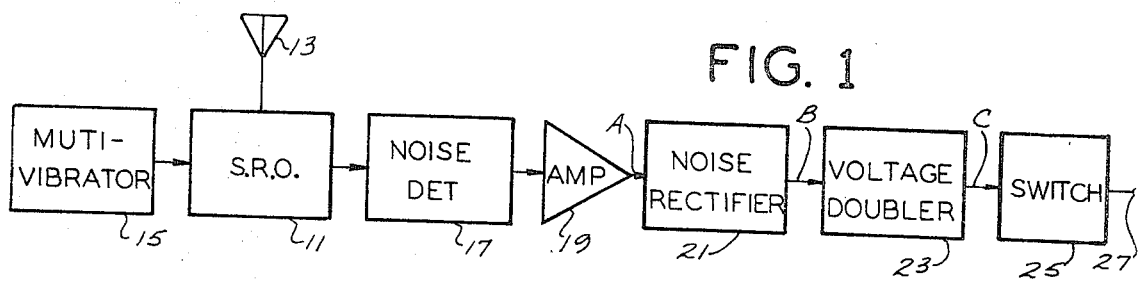
FIG. 1 is a block diagram of radar apparatus of this invention.

Referring now to the drawings, the apparatus illustrated is a fixed range altimeter suitable for controlling the opening of a supply drop parachute. In making supply drops from aircraft by parachute, it is highly desirable that the parachute not be opened until the package is relatively close to the ground so that drifting of the supply package with the parachute does not cause the package to be lost. Ordinary aneroid altimeters, however, are not sufficiently accurate to reliably provide chute opening at a predetermined, relatively low altitude and in addition must be compensated for the height of the land mass above sea level. The apparatus illustrated reliably provides an accurately timed parachute opening at a predetermined altitude without regard to the height of the land mass above sea level.

With reference to FIG. 1, a super-regenerative oscillator 11 is provided which is bidirectionally coupled to an antenna 13. As will be apparent hereinafter, antenna 13 may in fact comprise at least a portion of the tuned circuit of the oscillator. As is understood by those skilled in the art, a super-regenerative oscillator such as that indicated at 11 will periodically break into oscillations at a characteristic frequency with a repetition or squeg rate which varies as a function of the biasing of the oscillator. The components of the oscillator are selected so that the periodically occurring oscillations are at a characteristic frequency, e.g., 400 megacycles, which is appropriate for radar purposes in the intended application.

An astable or free-running multivibrator 15 is provided for periodically switching a bias signal applied to the oscillator between two different levels. The levels are selected so that one provides a squeg rate having a squeg period corresponding to the predetermined range at which it is desired to detect the presence of a target. This first squeg period is referred to hereinafter as the principal squeg period. The second level provides a squeg rate having a period which is twice the period of the first squeg rate. This second squeg period corresponds to a range which is slightly more than twice the predetermined range due to the slight delay or time offset between the sensitive period preceding each burst of oscillations and the burst of oscillations itself as noted previously. This second squeg period is referred to hereinafter as the double squeg period.

A noise detector circuit 17 is provided for detecting the random noise generated by the super-regenerative oscillator 11. As is understood by those skilled in the art, the random noise generated by a super-regenerative oscillator decreases markedly or is quieted when a signal at the oscillator's characteristic frequency is received during the sensitive periods. Thus the noise detector 17 will provide a signal which varies when a target passes through a predetermined range. While this example employs the characteristic quieting of the super-regenerative oscillator as a means of signal detection, other means may be used to register the reception of signals at the characteristic frequency, e.g., the variation in current consumption of the oscillator which occurs when signals are detected.

The noise signal provided by detector 17 is strengthened by an amplifier 19 which may also include various clipping or other signal conditioning circuits and the amplified noise signal is then rectified as indicated at 21 to provide a signal which varies as a function of the amplitude of the noise signal.

For reasons which will be described in greater detail hereinafter, the noise amplitude signal will have a substantial A.C. component, which is synchronized with the operation of the multivibrator 15, only when a target is present at the predetermined range, i.e., at that range corresponding to the principal squeg period. The noise amplitude signal is applied to a voltage doubler 23 which functions essentially as a peak-to-peak detector with respect to this A.C. component of the noise amplitude signal. The detected A.C. component is applied to a switching circuit 25 to provide at an output terminal 27 a signal which indicates the presence of a target at the predetermined range.

Figure 2:
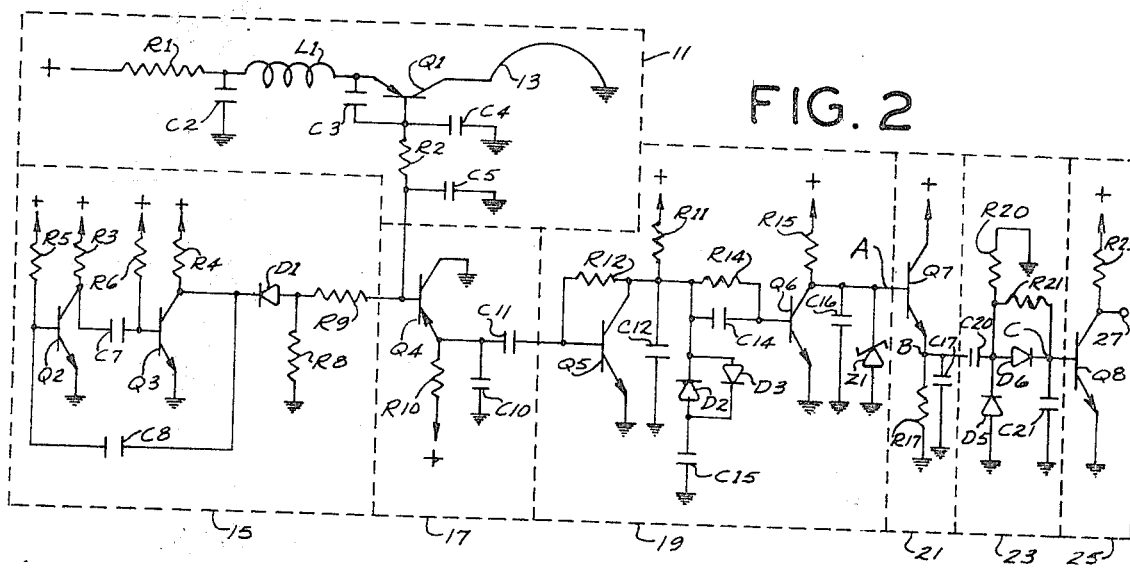
FIG. 2 is a schematic circuit diagram of the radar apparatus of FIG. 1.

Particular circuitry providing the operation just described generally is illustrated in FIG. 2, a suitable positive supply voltage being provided at each point in the circuit indicated by a (+) sign. The entire circuit of FIG. 2, including the antenna 13, may be constructed as an integral assembly on a single circuit board. The antenna 13 may, for example, comprise a partial loop formed by a conductor following the periphery of one end of the circuit board. The loop antenna forms a tuned collector circuit for a high-frequency PNP transistor Q1. Positive current is provided to the emitter of transistor Q1 through a current limiting resistor R1 and a high-frequency choke L1, radio frequency bypassing being provided by a capacitor C2. Regenerative feedback is provided by an A.C. voltage divider comprising a pair of capacitors C3 and C4. A biasing signal can be applied to the oscillator transistor Q1 through a resistor R2 which is of relatively low value, R.F. bypassing being provided by a capacitor C5. Oscillator 11 operates in a super-regenerative mode and breaks into oscillations at its characteristic frequency at a repetition or squeg rate which varies as a function of or depends upon the bias signal applied through resistor R2 to transistor Q1.

The multivibrator 15 comprises a pair of NPN transistors Q2 and Q3 which are provided with respective load resistors R3 and R4 and respective bias or timing resistors R5 and R6. The transistors are cross coupled collector-to-base by capacitors C7 and C8. As is understood, the multivibrator oscillates between a first state in which transistor Q3 conducts and a second state in which transistor Q3 is cut off, the durations of the states being determined by the relative values of resistors R5 and R6 and capacitors C7 and C8. In the altimeter illustrated, a multivibrator oscillation frequency of 15 cycles per second is suitable.

The collector of transistor Q3 is connected, through a diode D1, to the junction between a pair of bias resistors R8 and R9 which are connected for applying bias current to the oscillator 11. Accordingly, when transistor Q3 is in its conducting state bias current is applied to transistor Q1 through resistor R9 and when transistor Q3 is in its nonconducting state bias current is applied through resistors R8 and R9 in series. The value of resistor R9 is selected so that the principal squeg period corresponds to a predetermined range at which it is desired to detect the presence of a target. As an example, this range may be assumed to be 300 feet which corresponds to a principal squeg period of 0.8 miscrosecond. The resistor R8 is selected so that, when oscillator transistor Q1 is biased through resistors R8 and R9 in series, the squeg period is substantially twice the principal squeg period, i.e., 1.6 microsecond. This double squeg period, as noted previously, corresponds to a range which is slightly more than double the predetermined range corresponding to the principal squeg period since there is a slight delay or time offset between the sensitive period preceding each burst of oscillations and the burst itself.

Signals generated by the oscillator 11 can be conveniently picked up through the base circuit of transistor Q1. The noise detector 17 comprises a PNP transistor Q4 which is operated as a peak detector. The collector of this transistor is grounded and its emitter is connected to ground through a capacitor C10 and is supplied with current through a resistor R10. The base or input terminal of transistor Q4 is connected to the base circuit of oscillator transistor Q1, that is to the resistor R2 which, as noted previously, is of relatively low resistance value. Ignoring the radio frequency components, which are filtered out by capacitor C5, the signal provided to the base of transistor Q4 comprises a series of spikes which occur as the oscillator 11 squegs or periodically breaks into oscillations. The random noise generated by the oscillator comprises variations in the heights of these spikes or peaks. The time constant of resistor R10 and capacitor C10 is selected to eliminate, insofar as possible, the squeging signal itself and to pass only the noise signal, that is, the lower frequency components. A time constant of 10 microseconds is appropriate. This then is the detected noise signal.

This noise signal is coupled, through a capacitor C11 to the amplifier 19. Amplifier 19 includes a first stage comprising an NPN transistor Q5 provided with a load resistor R11 and a bias resistor R12. The amplified signal of the collector of transistor Q5 is additionally filtered by capacitor C12 to further eliminate unwanted high-frequency components. A clipping network comprising a pair of diodes D2 and D3 connected back-to-back and a capacitor C15 is provided for clipping transients which may be generated when the multivibrator 15 abruptly switches the bias signal applied to oscillator 11 from one level to another. The output signal from the collector of transistor Q5 is applied, through a coupling capacitor C14, to the base of a second NPN amplifying transistor Q6. Transistor Q6 is biased from the collector circuit of transistor Q5 through a resistor R14 which bridges capacitor C14 and is provided with a load resistor R15. The further amplified noise signals provided at the collector of transistor Q6 is additionally filtered by a capacitor C16 and is also further clipped by a Zener diode Z1, again to eliminate switching transients.

The noise rectifier stage 21 comprises an NPN transistor Q7 operated as a peak detector. Transistor Q7 is provided with an emitter load resistor R17 shunted by a capacitor C17. The amplified noise signal provided at the collector of transistor Q6 is applied to the base of rectifier transistor Q7. The time constant of resistor R17 with capacitor C17 is selected so that the signal provided at the emitter of transistor Q7 represents the amplitude of the noise signal and varies with variations in the amplitude of the noise signal, particularly such variations which occur in synchronism with or at the frequency of operation of the multi-vibrator 15, that is, at 15 cycles per second. The noise signal itself, being comprised of relatively higher frequency components, is substantially eliminated by the filtering provided by capacitor C17.

The voltage doubler 23 comprises a pair of capacitors C20 and C21 and a pair of diodes D5 and D6 which are interconnected in conventional fashion for charging capacitor C21 to a voltage which is substantially equal to the peak-to-peak voltage of any A.C. component in the noise amplitude signal. A pair of resistors R20 and R21 are provided for discharging the capacitors C20 and C21 when no A.C. component is present.

The voltage developed across capacitor C21 is applied to the switching circuit 25 which simply comprises an NPN transistor Q8, the capacitor voltage being applied to the base of the transistor. A load resistor R23 is provided in the collector circuit of transistor Q8. When the voltage on capacitor C21 reaches a predetermined threshold equal to the base-emitter offset voltage of transistor Q8, the transistor turns on providing at terminal 27 a negative going signal. The threshold is sufficiently high, in relation to the gain of the system, that relatively weak echoes from targets beyond two times the predetermined distance cannot turn on transistor Q8. As noted previously, the signal provided at terminal 27 is employed to indicate the presence of a target at the predetermined range.

When this apparatus is employed as an altimeter for parachute supply drops, the signal provided at the terminal 27 may be employed to trigger the release of the parachute thereby to cause the parachute to open at a predetermined altitude with respect to the actual ground level. The release of the parachute is accomplished by means which form no part of the present invention and are thus not described in detail herein, although it may be noted that, in one construction, the indication signal is employed to trigger an SCR which in turn fires a squib providing the mechanical release of the parachute.

Figure 3:
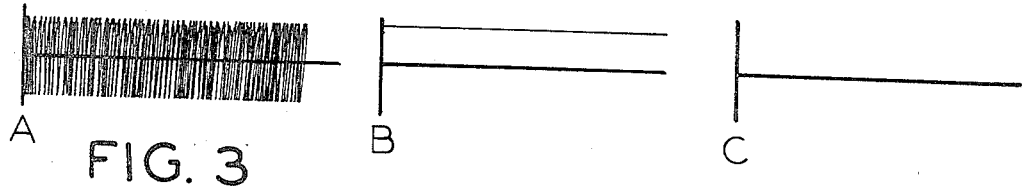
FIGS. 3–5 represent waveforms occurring at various points within the circuit of FIG. 2 under different target conditions.
Figure 4:
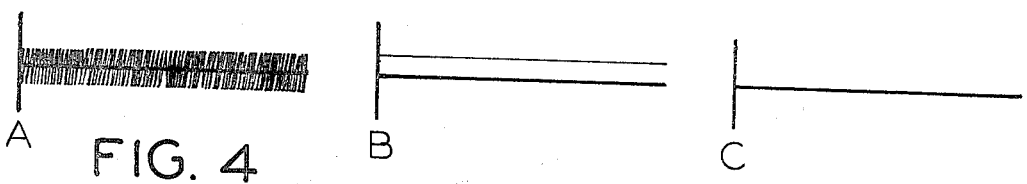
Figure 5:
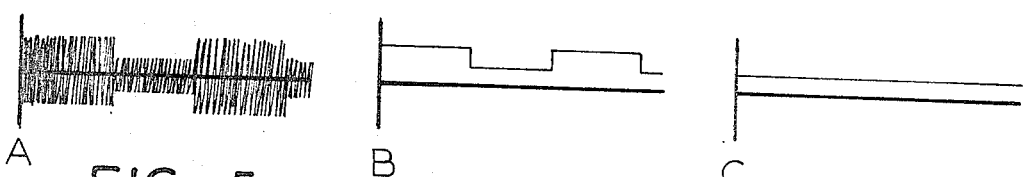

The manner in which the present apparatus avoids the redundancy or ambiguity latent in the use of a free-running super-regenerative oscillator may be understood with reference to the waveform representations of FIGS. 3–5. When a target is not present, or at least is not present at any range which will produce an echo during the sensitive periods of the operation of the oscillator 11, the noise generated by the oscillator remains at a relatively constant level. The noise signal provided at the point A in the apparatus of FIGS. 1 and 2 under such conditions is represented at A in FIG. 3. Accordingly, the noise amplitude signal present at point B in the circuit is a relatively constant voltage as represented at B in FIG. 3. Since this amplitude signal contains no A.C. component, substantially no voltage will be developed across capacitor C21 and thus the voltage at point C will be a substantially steady zero potential as represented at C in FIG. 3.

If a reflective target, e.g., the ground, occupies a position at a range, e.g., 700 feet, corresponding to the double squeg period, energy from one transmitted pulse will be reflected back to the oscillator and arrive during the next sensitive period when the oscillator is operating with the doubled squeg period. Further, when the oscillator is operating at the principal squeg period, energy transmitted during one burst of oscillation will be received back at the oscillator during the second subsequent sensitive period. Thus, the oscillator noise signal will be suppressed or quieted during both portions of the multivibrator's cycle and thus will be at a relatively uniform level as represented at A in FIG. 4. The noise amplitude signal, as represented at B in FIG. 4 will thus be again esesntially a D.C. signal, although at a reduced level as compared with the level produced when no reflecting target is present. Since this amplitude signal has substantially no A.C. component, the capacitor C21 will not be charged, this condition being represented at C in FIG. 4.

However, when a reflecting target occupies a position at the predetermined range corresponding to the principal squeg period, the situation changes considerably. In such a case, energy transmitted during one burst of oscillations will be reflected and received back at the oscillator during a sensitive period only if the oscillator is operating with the principal squeg period between bursts of oscillations. When the oscillator is operating with the doubled squeg period, reflecting energy will arrive back at the oscillator long before the next sensitive interval and thus the oscillator's operation will not be affected by the reflected signal. Accordingly, the noise signal will, as represented at A in FIG. 5, vary in synchronism with the changing of the squeg rate at which the oscillator is operated, that is, in synchronism with the switching of the bias signal applied to the oscillator under control of the multivibrator 15. Accordingly, the noise amplitude signal will, as represented at B in FIG. 5, also change amplitude in synchronism with the operation of the multivibrator. This amplitude signal, having a substantial A.C. component, will thus cause the capacitor C21 to be charged, by the operation of the voltage doubler circuit 23, to a significant D.C. voltage as represented at C in FIG. 5. This voltage causes the transistor Q8 to conduct and to thereby provide, at the terminal 27, a sharply switched signal which indicates the presence of a target at the predetermined range. From the foregoing description it can be seen that this signal is provided only when the target is at the predetermined range and not at ranges corresponding to multiples of the principal squeg period. Thus ambiguity is eliminated from the information provided by the radar apparatus.

In one respect, the operation of the oscillator at the doubled squeg period can be seen to establish a reference against which the operation at the principal squeg period can be compared. Thus, if the operation is substantially the same at the two different period values, it is then known that no target is present at the predetermined range although such a target may be present at a range corresponding to the doubled period. When the operation is different at the two different period values, it is then known that the target is present at the predetermined range rather than at some other range which is rationally related to the predetermined range.

In view of the above, it will be seen that the several objects of the present invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Radar apparatus for detecting the presence of a target at a predetermined range, said apparatus comprising:
    a super-regenerative oscillator having a squeg rate which varies as a function of a bias signal applied to said oscillator;
    means for periodically switching the bias signal applied to said oscillator between at least a first predetermined level and a second predetermined level, said first level providing a first squeg rate corresponding to said predetermined range, said second level providing a second squeg rate having a period which is an integer multiple of the period of said first squeg rate; and
    means responsive to the random noise generated by said oscillator for providing a signal indicating the presence of a target at said predetermined range when substantial variations in the amplitude of said random noise occur in synchronism with the periodical variation of said bias signal whereby said indicating signal is provided only at said predetermined range.

2. Radar apparatus for detecting the presence of a target at a predetermined range, said apparatus comprising:
    a super-regenerative oscillator having a squeg rate which varies as a function of a bias signal applied to said oscillator;
    means for periodically switching the bias signal applied to said oscillator between at least a first predetermined level and a second predetermined level, said first level providing a first squeg rate corresponding to said predetermined range, said second level providing a second squeg rate having a period which is twice the period of said first squeg rate;
    means for detecting the random amplitude noise generated by said oscillator;
    means for rectifying said noise to provide a signal which varies as a function of the amplitude of said noise; and
    means for detecting variations in the noise amplitude signal which occur at the rate at which said bias signal is switched and for providing a signal indicating the presence of a target at said predetermined range when said variations exceed a predetermined level.

3. Radar apparatus as set forth in claim 2 wherein said oscillator includes a loop antenna.

4. Radar apparatus as set forth in claim 2 wherein said means for periodically switching the bias signal comprises an astable multivibrator.

5. Radar apparatus as set forth in claim 2 wherein said means for detecting the random amplitude noise is a peak detector including means for substantially filtering the squeg signal generated by said oscillator.

6. Radar apparatus as set forth in claim 5 further comprising means for amplifying the noise detected by said peak detector.

7. Radar apparatus as set forth in claim 6 wherein said means for amplifying the noise detected includes means for clipping transients generated by the switching of said bias signal.

8. Radar apparatus as set forth in claim 2 wherein said means for rectifying said noise comprises a peak detector including means for substantially filtering said noise and passing variations in the amplitude of said noise.

9. Radar apparatus as set forth in claim 2 wherein said means for detecting variations in the noise amplitude signal comprises means responsive to the A.C. components only of said noise amplitude signal.

10. Radar apparatus as set forth in claim 2 wherein said means for detecting variations in the noise amplitude signal comprises a voltage doubler.

11. Radar apparatus as set forth in claim 2 including a transistor switch which is turned on when the detected variations in said noise amplitude signal exceed a predetermined threshold.

12. Radar apparatus for detecting the presence of a target at a predetermined range, said apparatus comprising:
    a super-regenerative oscillator having a squeg rate which varies as a function of a bias signal applied to said oscillator;
    an astable multivibrator for applying to said oscillator a bias signal which periodically switches between a first predetermined level and a second predetermined level, said first level providing a first squeg rate corresponding to said predetermined range, said second level providing a second squeg rate having a period which is twice the period of said first squeg rate;
    a peak detector for detecting the random amplitude noise generated by said oscillator, said peak detector including means for substantially filtering the squeg signal generated by said oscillator;
    means for rectifying and filtering said noise to provide a signal which varies as a function of the amplitude of said noise; and
    an A.C. component detector for detecting variations in the noise amplitude signal which occur at the rate at which said bias signal is switched and for providing a signal indicating the presence of a target at said predetermined range when said variations exceed a predetermined level.

13. Echo ranging apparatus for detecting the presence of a target at a predetermined range, said apparatus comprising:
    a super-regenerative oscillator having a squeg rate which varies as a function of a bias signal applied to said oscillator, said oscillator including means for bi-directionally coupling oscillatory energy between said oscillator and a wave propagation environment;
    means for obtaining from said oscillator an output signal which varies when a target passes through ranges corresponding to the squeg rate at which the oscillator is operating and integer submultiples of that rate;
    means for periodically switching the bias signal applied to said oscillator between at least a first predetermined level and a second predetermined level, said first level providing a first squeg rate corresponding to said predetermined range, said second level providing a second squeg rate which is an integer submultiple of said first squeg rate;

means for determining from said output signal a reference level during periods when said bias signal is at said first predetermined level and a detection level during periods when said bias signal is at said second predetermined level; and means for providing a signal indicating the presence of a target at said predetermined range when said detection level varies substantially relative to said reference level.

14. Echo ranging apparatus as set forth in claim 13 wherein said second squeg rate is half of said first squeg rate.

References Cited

UNITED STATES PATENTS

| 2,975,414 | 3/1961 | Boyle | 343—13 |
| 2,980,905 | 4/1961 | Gratian et al. | 343—13.1 |
| 2,984,833 | 5/1961 | Nieset et al. | 343—13.1 |

RODNEY D. BENNETT, Primary Examiner

M. F. HUBLER, Assistant Examiner

U.S. Cl. X.R.

102—70.2; 343—13